Dec. 5, 1967   H. V. MILES, JR   3,356,215
APPARATUS AND METHOD FOR THE FILTRATION-THICKENING
OF SUSPENSIONS OF SOLIDS
Filed April 22, 1965   6 Sheets-Sheet 1

FIG. 1

INVENTOR.
HARRY V. MILES
BY Theodore M. Jablon
ATTORNEY.

INVENTOR.
HARRY V. MILES
BY Theodore M. Jablon
ATTORNEY.

Dec. 5, 1967  H. V. MILES, JR  3,356,215
APPARATUS AND METHOD FOR THE FILTRATION-THICKENING
OF SUSPENSIONS OF SOLIDS
Filed April 22, 1965  6 Sheets-Sheet 4

INVENTOR.
HARRY V. MILES
BY *Theodore M. Jablon*
ATTORNEY.

Dec. 5, 1967 H. V. MILES, JR 3,356,215
APPARATUS AND METHOD FOR THE FILTRATION-THICKENING
OF SUSPENSIONS OF SOLIDS

INVENTOR.
HARRY V. MILES
BY Theodore M. Jablon
ATTORNEY.

FIG. 13

3,356,215
APPARATUS AND METHOD FOR THE FILTRATION-THICKENING OF SUSPENSIONS OF SOLIDS
Harry V. Miles, Jr., Westport, Conn., assignor to Dorr-Oliver Incorporated, Stamford, Conn., a corporation of Delaware
Filed Apr. 22, 1965, Ser. No. 450,119
9 Claims. (Cl. 210—82)

ABSTRACT OF THE DISCLOSURE

This invention relates to the continuous filtration-thickening of a suspension of solids or slurry under pressure, which produces filtrate liquid and a pumpable thickened sludge. The inention features an improved valve device for continuously group-wise backwashing the depending tubular filter elements by supplying wash liquid or filtrate liquid under a pressure greater than the filtration pressure, to a rotating conduit sequentially communicating with respective groups of filter elements. The invention also provides a novel operating system that permits continuous cake discharge and filter media cleaning by means of a flow control device and a back pressure regulator wherein a constant flow of backwash liquor is applied irrespective of pressure conditions within the filtration apparatus proper.

In such a thickening operation the filter elements are subjected to alternating periods of filtration and back washing. During the filtration periods a layer of suspension solids accumulates upon the exterior of the filter elements, while filtrate liquid is delivered from their interior upwardly into a filtrate receiving zone. The intervening back wash periods cause the layers of accumulated solids to be released from the filter elements, and to fall in fragments or lumps through the surrounding liquid into a subjacent accumulation or bed of thickened sludge while also cleansing the filter media.

It is among the objects of this invention to provide improvements whereby the filtration-thickening operation may be carried out continuously and cyclically, preferably employing the filtrate liquid itself for back washing. Also, the aim is that the improved apparatus should be compact, simple in construction and efficient in operation, as well as constructed so that the filter elements are readily accessible and serviceable and so that the operation is flexible with respect to establishing the lengths of the filtration and the back wash periods, relative to one another in the operating cycle, and also generally flexible with respect to capacity and other design requirements.

To this end, the invention proposes (a) Establishing a number of pressure filtration zones arranged in parallel, each of which zones comprises a group of elongated hollow filter elements having their upper ends mounted in a plate so that filtrate forced into the interior of the filter elements will pass upwardly through the plate from each filtration zone into a separate receiving chamber while a layer of suspension solids builds up exteriorly upon the filter elements, (b) Providing a supply of back wash liquid at a pressure greater than the feed pressure in the filtration zones; and (c) Sequentially establishing flow connection from the back wash supply to each of the filtrate receiving zones for sequentially back washing each group of filter elements associated with each receiving zone, while continuing filtration of the filter elements in zones not communicating with the wash supply. The layers of solids accumulated on the filter elements under the filtration pressure, are released by greater back wash pressure, to fall through surrounding liquid into a subjacent zone of sludge accumulation, while filtrate liquid continuously passes from the filtrate receiving zones not communicating with the back wash supply.

Features of the invention lie in the arrangement and construction of valve means for selectively or sequentially connecting the back wash supply with the aforementioned groups of filter elements via the respective filtrate receiving chambers.

Other features lie in the structural organization of an apparatus which comprises a pressure filtration section containing the groups of filter elements, a filtrate receiver section providing filtrate receiving chambers for the respective groups of filter elements, and a valve section communicating with the receiving chamber for selectively or sequentially and cyclically establishing flow connection from the wash supply means to the filtrate receiving chambers, while collecting and discharging filtrate liquid from the chamber not so connected.

Other features lie in the provision of means for varying the length of the back wash period relative to the length of the filtration period.

Other features lie in an improved assembly and construction of the filter elements.

In a preferred embodiment the filtration-thickening unit comprises a tank having a feed connection for supplying the solids suspension under pressure and having discharge means for delivering thickened sludge, a horizontal plate member constituting with the tank a pressure filtration chamber, a substantial number of hollow elongate filter elements depending from the plate member and mounted for delivering filtrate liquid upwardly through the plate member, and a hollow cover member or shell structure so partitioned as to constitute with the plate member sector-shaped filtrate receiver chambers each communicating with a group of said filter elements, and a valve device for supplying at different times to different receiver chambers and their groups of filter elements a reverse flow of back wash liquid under a pressure greater than the filtration pressure, while subjecting the other groups of filter elements to pressure filtration.

More particularly, the valve device comprises a peripheral upright wall, a top plate, and a bottom plate constituting with said wall and top plate a valve housing. The bottom plate has flow passage openings equally spaced around the vertical axis of the housing, and communicating with respective filtrate receiver chambers. A rotary valve member or conduit turnable about said axis and cooperating with said flow passage openings supplies backwash liquid sequentially to the groups of filter elements. A stationary structure within the housing defines therein a supply chamber for backwash liquid, and a filtrate collecting chamber. The wash supply chamber communicates with the inlet end of the rotary conduit during its rotation, in substantially liquid-sealed relationship therewith. The filtrate collecting chamber receives the filtrate liquid from the filtrate receiver chambers and thus from their respective groups of filter elements, for discharge from the valve housing.

Still other features lie in the provision of automatic controls for the operation of the filtration-thickening apparatus.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 1:
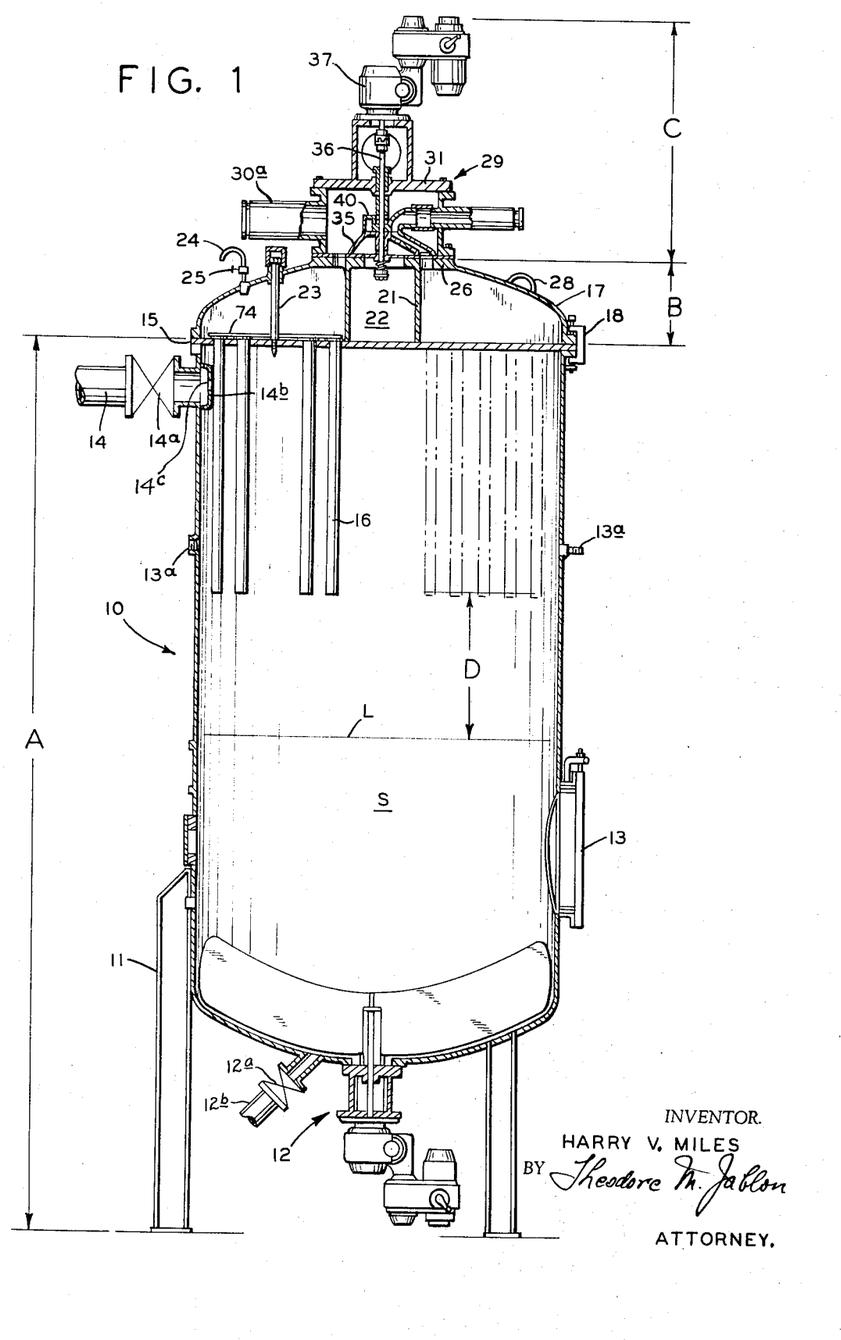
FIG. 1 is a vertical section of a filtration-thickening unit embodying the invention, showing the main operating sections of the apparatus, and featuring a rotary conduit or valve member for back washing the filter elements, and actuating means therefor.

In the embodiment illustrated in FIG. 1 the filtration-thickening apparatus comprises three main sections A, B, C.

Section (A) wherein a pressure filtration tank surrounds a cluster of numerous hollow upwardly open elongate filter elements. These filter elements or filter tubes are subjected to periods of pressure filtration to accumulate a layer of suspension solids on the outer surface of these elements, alternating with periods of back washing to effect the release of the layers of solids as well as the cleansing of the filter media, Section (B) wherein a cluster of filtrate receiver chambers are disposed around a vertical axis communicating each with a group of the filter elements, Section (C) for continuously collecting the filtrate liquid while sequentially and cyclically back washing the groups of filter elements, by employing a rotatable conduit member actuated to sequentially establish flow connection from a back wash pressure liquid supply to each filtrate receiving chamber and thus to each group of the filter elements.

Section (A) of the apparatus comprises a cylindrical tank 10 supported on legs 11. In the tank bottom is mounted a variable-speed motor-driven agitator mechanism 12 for maintaining a bed S of heavy thickened sludge in a flowable condition for withdrawal through a control valve 12a provided in a discharge connection 12b. A lateral manhole 13 as well as various tap connections 13a are provided on the tank. A supply connection 14 with valve 14a for introducing the solids suspension to be thickened under pressure is provided near the top of the tank, delivering into a feed distributing conduit 14b which may extend peripherally along the inner surface of the tank, with discharge openings 14c spaced along this conduit.

The top end of the tank itself is closed by a plate member 15 to which are removably connected the upper ends of the numerous depending tubular filter elements 16 upon which a layer of suspension solids may be formed while filtrate liquid passes from the interior of these elements upwardly through the plate. Downwardly the filter elements terminate a distance D from what is indicated to be the potential maximum level L of the bed of settled thickened sludge, that distance being adequate to allow for the lumps or fragmented layer of solids when released from the filter elements to fall onto or into the bed of sludge.

Figures 2, 3, 3A:
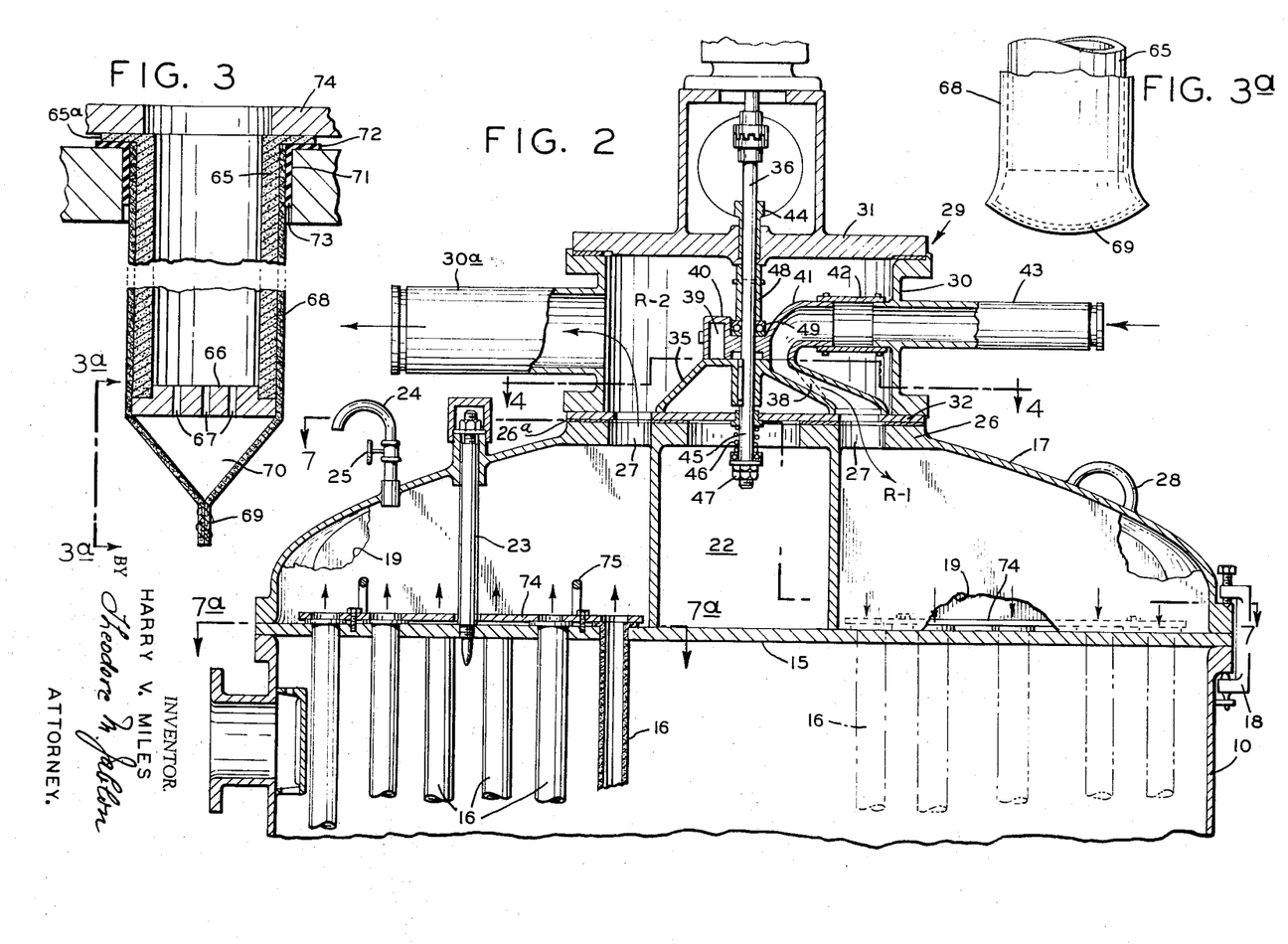
FIG. 2 is an enlarged view of the entire top end portion of the apparatus showing more clearly the assembly of the main operating sections and the mechanism for continuous operation.
FIG. 3 is an enlarged detail view of one of the filter elements.
FIG. 3a is a side view of the lower end of the filter element taken on line 3—3 of FIG. 3.

Section (B) of the apparatus comprises a hollow cover or dished cover member 17 overlying the plate member 15 and marginally fastened thereto and to the top end of the tank by means of quick removable screw clamps 18. This cover member 17 has internal radial partitions 19 defining with the plate member 15 a cluster of filtrate receiving chambers 20 sector-shaped and disposed around the vertical axis of the tank. The inner narrow ends of these receiving chambers are bounded by a cylindrical vertical wall or tubular partition 21 which itself defines a central chamber 22. The cover member 15, and the top end of the tank with the plate 15 between them are held tightly together by means of screw clamps 18. The assembly and the relationship of the parts is such that the bottom edges of the partition means in the cover member close tightly upon the plate member 15.

Penetrating each filtrate receiving chamber 20 is a vertical anchoring bolt 23 for further securing the cover member and the bottom edges of the partition means tightly upon the plate member 15. Each chamber 20 further has a tap 24 with closure valve 25 through which the filtrate liquid from each of the chambers 20 may be sampled for testing of its clarity or turbidity as an indicator of possible defectiveness of any filter elements in the respective group served by the receiving chamber 20 being tested.

Figure 7:
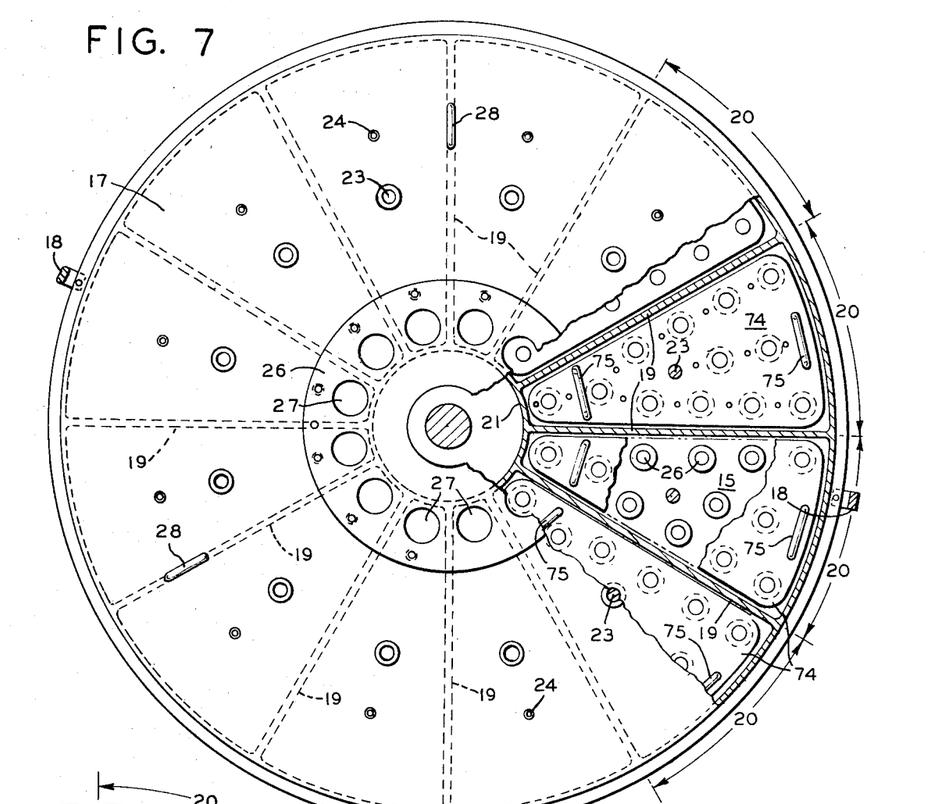
FIG. 7 is a cross-section taken on line 7—7 of FIG. 2, illustrating a dished top cover radially partitioned to provide sector-shaped filtrate receiving chambers.
Figure 7A:
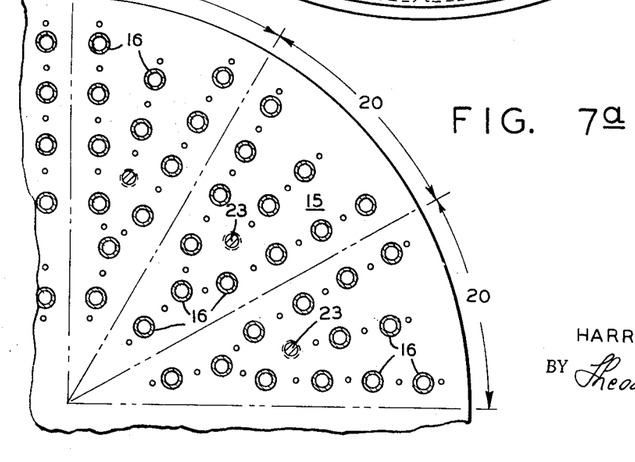
FIG. 7a is a partial cross-section taken on line 7a—7a of FIG. 2, illustrating the arrangement and disposition of the tubular filter elements in the supporting plate member.

The dished and partitioned cover member 17 is formed at the top with a central horizontal plate portion 26 provided with a port 27 for each chamber 20. These ports 27 are arranged in a circle around the vertical axis of the tank, providing communication between each chamber 20 and the aforementioned filtrate collecting and back washing section (C) mounted atop the cover member 17. This cover member further has external eyes 28 whereby the entire top assembly comprising sections (B) and (C) may be conveniently lifted off the plate member 15 after removal of the screw clamps 18 for inspection of the filter elements. The mounting of the filter elements themselves and their particular construction will be described in more detail below.

In section (C) a casing structure 29 for collecting the filtrate liquid from the chambers 20 provides a filtrate collecting chamber 29a, and is here shown to comprise a cylindrical body portion 30 having a filtrate discharge connection 30a and a top cover plate 31 fastened thereto. A wear plate 32 at the bottom of this casing structure is here indicated as part of section (C). This plate is interposed between the bottom face of casing structure 29 and the top face of cover structure 17, the parts being bolted together tightly in face-to-face relationship to one another. The wear plate has ports 33 of trapezoidal shape (see FIG. 4) in general registering with ports 27 in the cover member 15.

Within the casing structure 29 or filtrate collecting chamber 28 is mounted a distributing mechanism 34 operable to supply a reverse flow of back wash pressure liquid, preferably the filtrate liquid itself, sequentially to the chambers 20 in repetitious cycles. At least one of the chambers 20 and the group of filter elements communicating therewith are subjected to back washing, while the other groups of filter elements as defined by the other chambers 20, are being subjected to pressure filtration.

The mechanism 34, according to the present example, comprises a rotary conduit member or rotary valve 35 fixed to a vertical shaft 36 actuated as by motorized variable speed drive means 37 for rotating the conduit member so that an inclined radial conduit passage 38 in valve member 35 is placed in flow communication sequentially with chambers 20 for passing back wash liquid downwardly thereto as indicated by arrows R–1, while filtrate liquid passes upwardly in the direction of arrow R.–2 from those other chambers 20 not communicating with the back wash conduit passage 38. While rotating this passage communicates at all times with an inverted annular supply channel 39 formed by a stationary annular header 40 surrounding the shaft and having planar face-to-face contact with the top face of the rotary conduit member 35. This annular header has a neck 41 communicating through a flexible tubular joint 42 with an inlet 43 which is part of casing structure 29.

The vertical shaft is keyed or splined to the conduit member and slideable therein to a small extent while rotating freely in the annular header 40. The shaft extends upwardly through the top plate 31 by way of a suitable seal or stuffing box 44. This shaft has a lower end portion 45 projecting through wear plate 32 into the central chamber 22. A compression coil spring 46 surrounding this lower shaft end portion is confined between stop nuts 47 and the wear plate 32, urging the annular header 40 into planar operating contact with the rotary conduit member, and the conduit member 35 into planar operating contact with the wear plate 32. The spring pressure is thus effective through a sleeve 48 fixed on the shaft, acting on a vertical thrust ball bearing 49.

The rotary flow conduit member as shown in the embodiment of FIGS. 4, 5, 6, 8, 9, 10, 11, and 12 has smoothly machined parallel top and bottom faces F–1 and F–2 respectively, in operating contact with similarly treated faces of the annular header 40 and the wear plate 32. This rotary conduit member or casting comprises a basic shape or body portion in the form of a hollow trunco-conical body 50 open at the bottom but closed at the top except for the inlet opening of an inclined flow conduit portion 51 interrupting the basic trunco-conical shape. The inclined conduit itself has an inflow area A–1 and an outflow area A–2. Internally the trunco-conical hollow body portion is formed with a hub portion 52 keyed or splined to the shaft which is slideable therein to a small extent.

Figure 4:
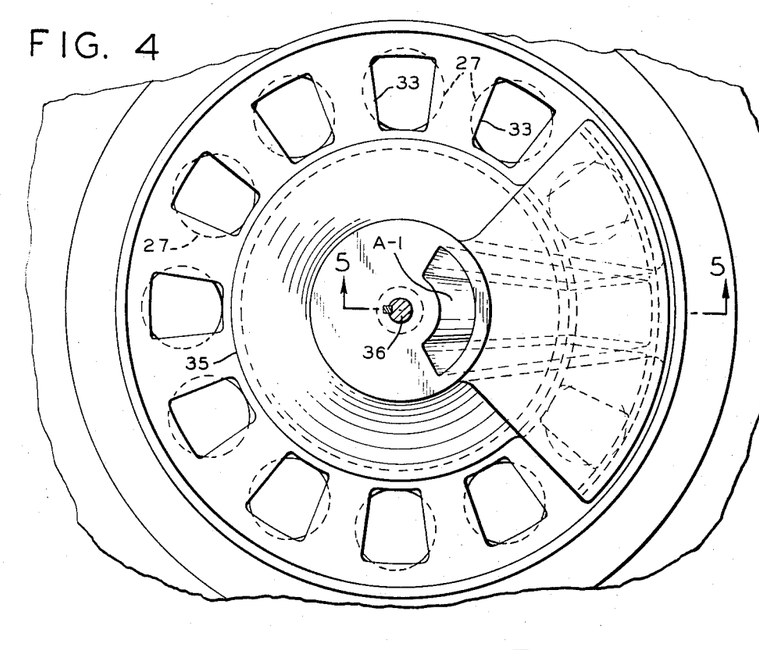
FIG. 4 is a cross-section taken on line 4—4 of FIG. 2 showing the rotary back wash conduit member and associated stationary backflow passages arranged in a circle about the axis of rotation of the conduit member.
Figures 5, 6:
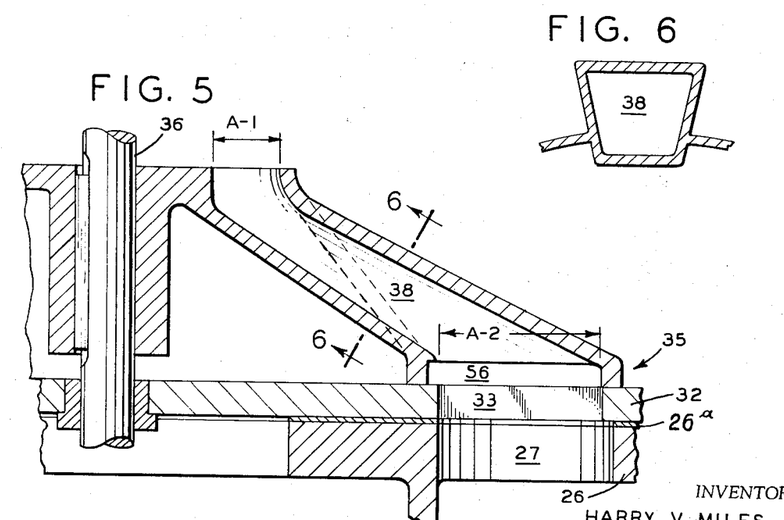
FIG. 5 is a part-sectional view taken on line 5—5 in FIG. 4, further illustrating the rotary conduit member communicating with one of the associated stationary back flow passages.
FIG. 6 is a detailed sectional view of the conduit member taken on line 6—6 of FIG. 5.
Figure 8:
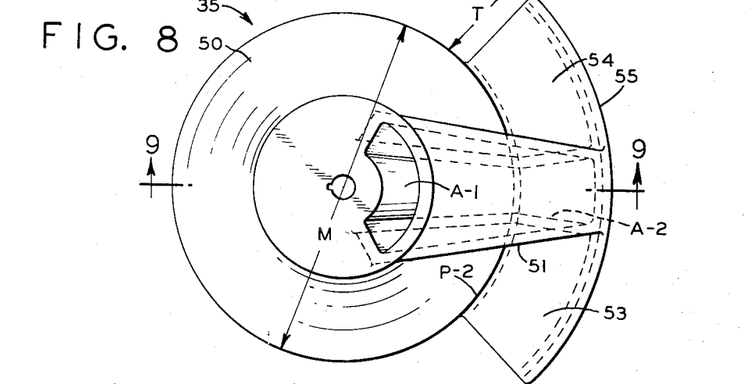
FIG. 8 is a detailed view of the rotary conduit member as seen from the top.

From the top plan view of the conduit member in FIGS. 4 and 8 it will be seen that the inclined conduit portion 51 therein juts out a distance (T) beyond the base diameter M of the trunco-conical body portion. Horizontal arcuate wing portions 53 and 54 extend laterally in opposite directions from the lower end of the conduit portion 51, the wing portion being integral also with the bottom end of the trunco-conical shape. These wing portions together with the conduit portion 51 form a radially projecting arcuate portion 55 (see FIGS. 8 and 10).

Figures 9, 10, 11, 12:
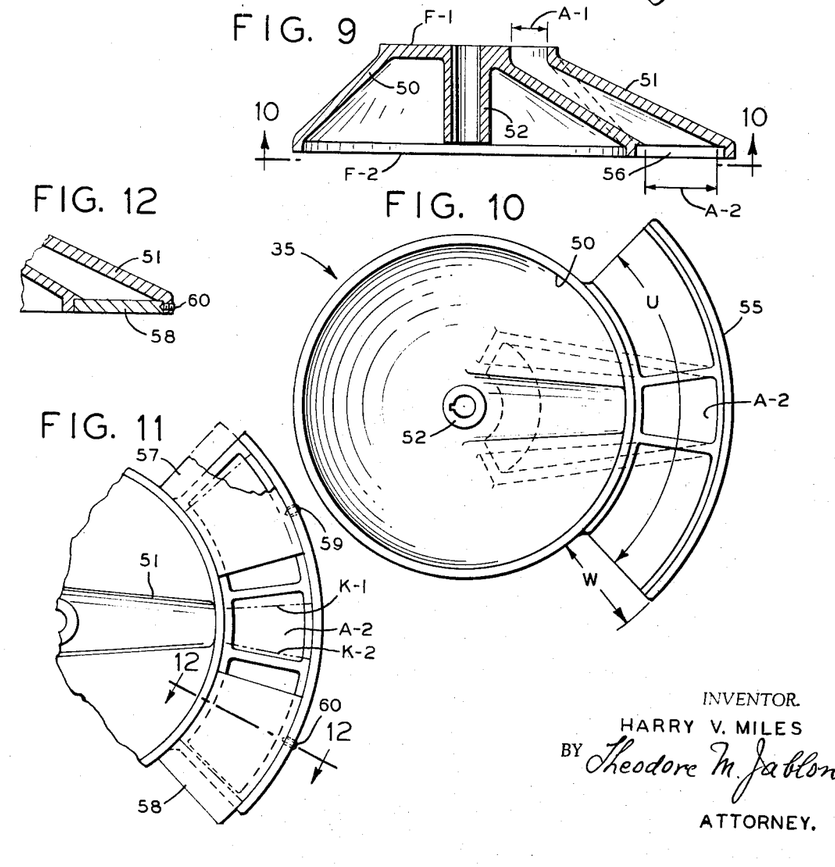
FIG. 9 is a section taken on line 9—9 of the conduit member in FIG. 8.
FIG. 10 is a bottom view of the rotary conduit member taken on line 10—10 of FIG. 9.
FIG. 11 is a partial bottom view similar to FIG. 10, showing adjustable means for varying the back wash flow passage area, and thus the length of the back wash period.
FIG. 12 is a detailed section taken on line 12—12 in FIG. 11, further illustrating adjustable means for varying the length of the back wash period.

From the bottom view of the conduit member in FIG. 10 is will be seen that the projecting arcuate portion 55 is formed at its underside with a shallow arcuate groove 56 of a width W and of a mean arcuate length U (see FIG. 10). Furthermore, according to the bottom view of the conduit member in FIG. 11, a pair of arcuate plates or bridge members 57 and 58 are slideably fitted into this shallow groove, which members have bottom faces that are flush with the bottom face F–2 of the conduit member (see FIG. 12). These arcuate bridge members are slideable in the groove to respective adjusted positions maintainable at by set screws 59 and 60. By thus positioning the bridge members relative to one another as well as relative to the flow area A–2 the length of the back wash period nay be varied accordingly. A longer period is represented by the full-line position of these bridge members, while the dot-and-dash line position K–1 and K–2 of these members represents a shortened period.

The individual construction of the tubular filter elements 16 and the manner in which they are connected to the plate 15, is described as follows:

Referring to the embodiment shown in the enlarged detail FIGS. 3 and 3a a filter element 16 comprises a length of rigid tube 65 of porous material of substantial wall thickness, for example, porous polypropylene material which is largely resistant to the effect of chemicals and the effect of heat. The upper end of the rigid tube has bonded thereto a flange 65a while the lower end is closed by an end piece 66 firmly bonded to the tube and having perforations 67.

Closely surrounding the rigid tube is a sleeve 68 of flexible porous filter media material which may be in the nature of a suitable filter cloth or felt. The lower end of this tubular sleeve of filter media is closed for instance by a seam 69 and/or a bonding substance, thus forming a small downwardly pointed pocket 70 below the lower end of the rigid tube.

The upper end of the filter media sleeve 68 is connected to a flanged member 71 consisting of a flexibly resiliently deformable material such as a rubber type material. This flanged member has a flange portion 72 from which extends a cylindrical portion 73 which is peripherally firmly connected to the upper end of the filter sleeve as by a peripheral seam and/or a bonding substance. When a filter element thus composed is in place connected to the plate 15, the rigid tube flange 65a and the adjoining flexible flange 72 are held firmly in compression by a retainer plate 74 bolted down upon the plate 15, with the rubber flange portion 72 thus acting as a gasket for sealing the connection against the operating pressure in the tank. The retainer plates 74 one in each chamber 20, are of corresponding sector-shaped configuration as clearly seen in FIG. 7, which plates have handles 75 for lifting when the plates are being detached for inspection of the filter elements.

The operation of the filtration-thickening apparatus of this invention is highly flexible insofar as the length of the filtration period may be readily varied by varying the speed of the rotary back wash conduit member. While such an adjustment will correspondingly vary the length of the back wash period within the operating cycle, nevertheless the invention provides additional flexibility in that the back wash period itself may be varied by the setting of the bridge members 57 and 58.

Furthermore, with respect to design flexibility applicable to this unit, it will be noted that the basic ratio of the length of the period of filtration to the length of the back wash period may be varied by varying the internal partitioning of the cover member 17 whereby the number of filtrate receiving chambers 20 with their associated groups of filter elements, may be varied, along with a corresponding change of the number of ports in the wear plate 32. The movement of the rotary back wash conduit member may be continuous or it may be in steps from one port 16 to the next.

Because of the above indicated operational flexibility, the continuous filtration-thickening unit of this invention is particularly well suited for thickening suspensions which may require short filtration cycles, that is where the filtration periods must be relatively short due to the nature of the solids in the suspension. This problem is readily met by the choice of an adequate speed of the rotary back wash conduit member. An example for such a condition is found when thickening the so-called "White Liquor" derived from paper pulp digestion wherein finely divided calcium carbonate is suspended in a caustic liquor, to effect the separation and recovery for re-use of the solution separate from the finely divided calcium carbonate which in turn may also be re-useable. In such an instance, the period of filtration may only be long enough to allow a relatively thin dense layer of these fine solids to be formed upon the filter elements, which layer must be released in order to be followed by a thorough cleansing reverse flow of back wash liquor through the filter media while the same are in an expanded state. In that state, particles can be readily dislodged from the expanded pores of the filter media, as back wash liquor easily distributes itself through the spacing created by the back wash pressure between the expanded filter media and the rigid tube.

Again, when the pressure filtration period is initiated, the filter media sleeve contracts against the rigid porous backing tube, whereby in turn the chance of blinding of the media is reduced or minimized.

Figure 13:
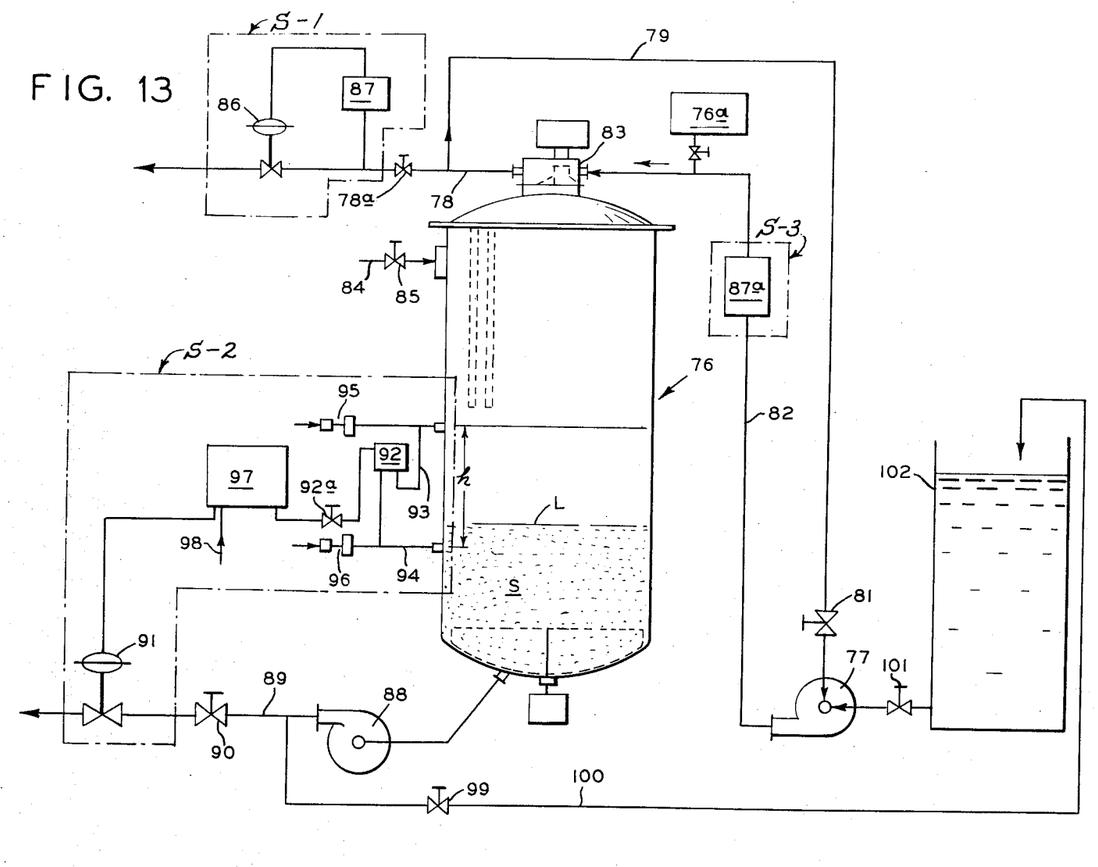
FIG. 13 shows diagrammatically various automatic operating controls for conducting the filtration-thickening operation of this invention.

As illustrated in FIG. 13, in the operation of the invention automatic flow rate controls may be employed, whereby the supply of back wash filtrate liquor is maintainable at a steady rate, unaffected by variations or increases in the back wash flow resistance offered by the filter elements. Adequate filter wash efficiency is thus automatically maintainable until such time that the filter media may require servicing, that is removal thereof for mechanically and chemically-assisted thorough washing and scrubbing or else for the purpose of replacement.

Accordingly, in FIG. 13, a filtration-thickening unit 76 which may be similar to the one described above, is provided with a pump 77 for recirculating filtrate liquor into the unit for back washing. Accordingly, the filtrate discharge line 78 has a branch line 79 leading to the pump, and provided with a shut-off valve 81. The pump through line 82 delivers the filtrate under the required pressure to the back wash connection 83 of the unit, which pressure is in excess of the feed pressure at which the solids suspension enters the unit at 84 through shut-off valve 85.

The filtrate discharge line 78 has a diaphragm type valve 86 controlled by a Constant Back Pressure Regulator 87 effective to maintain a relatively slight but constant pressure in discharge line 78 and thus in branch line 79 leading to the pump. The pump discharge line 82 has an Automatic Flow Controller 87a effective to admit the back wash liquor into the unit at a pre-set substantially constant volumetric rate of flow irrespective of changes in the back wash flow resistance of the filter elements in the unit. An expansion tank 76a communicating with line 82 on the downstream side of controller 87a, will eliminate or cushion pressure pulsations that might occur incident to the rotation of the rotary back wash valve in unit 76 previously described.

Another control system is provided for automatically maintaining the level of the sludge bed S in the unit. In this system a sludge pump 88 delivers sludge from the sludge bed through a discharge line 89 having a shut-off valve 90 and downstream therefrom a diaphragm type control valve 91 actuated by control devices responsive to variations in the sludge level L of the bed. These control devices comprise a Differential Pressure Cell Device 92 responsive to changes in the specific gravity of a liquid column of the height "h" which is the vertical effective distance between pressure tap lines 93 and 94 receiving each a small flow of purge water at a constant rate by way of Constant Flow controllers 95 and 96 respectively. Thus, whenever the specific gravity of column "h" rises due to an undue rise of sludge level L, the device 92 will send corrective pressure impulses through a shut-off valve 92a to an automatic Relay Device 97 which in turn regulates an auxiliary air pressure supply 98 acting upon the diaphragm valve 91 to correctively change the sludge delivery rate. The device 97 may comprise an arrangement for manual operation.

Nevertheless, for example in the separation of calcium carbonate, it may become periodically necessary to cleanse the filter media more thoroughly by means of washing with an acid solution effective to dissolve carbonate particles trapped in the filter media. For that purpose, the supply of feed suspension is shut off by closing valve 85, and so is the supply of the regular back wash liquid by closing valve 81. The tank itself is then drained empty as by pump 88, whereupon valve 90 in the sludge line is also closed, while a valve 99 in a line 100 is opened.

The unit is now ready for acid washing, that is for substituting the acid wash liquid for the regular back wash or filtrate liquid. Accordingly, after opening a valve 101, the back wash pump 77 may be employed to pump the acid wash liquid from a supply tank 102 through line 82 to wash inlet 83 of the unit and thus into and through the filter elements. The valve member 35 may be moved stepwise from one washing position to the next, to be held in each position so as to apply the acid wash to each group of filter elements for a sufficient length of time. The spent or partially spent acid wash solution may be collected in the tank space below the filter elements before being transferred to tank 102. The acid wash liquid may be recirculated until substantially spent. Sludge pump 88 may be utilized for returning acid wash liquid via line 100 and open valve 99 to acid wash tank 102 or to another tank.

For example, the various control units applicable in the operation of FIG. 13, may be as follows:

System S-1:
Discharge Back Pressure Valve 86—by Fischer & Porter, FIG. 165.
Discharge Back Pressure Controller 87—by Minneapolis Honeywell 3-15 p.s.i. (standard).

System S-2:
Differential Pressure Cell 92—by Fischer & Porter 13D14698.
Differential Pressure Controller 97—by Fischer & Porter 1451WR41-53PR4520.
Sludge Discharge Valve 91—by Red Jacket Co., Type A.

System S-3:
Back Wash Flow Controller 87a—by Kates Regulator 705A.

It will furthermore be understood that each of the elements, or two or more together, may also find a useful application in other types of filtration-thickening apparatus differing from the type described above.

While the invention has been illustrated and described as embodied in a continuously operating filtration-thickening unit, it is not intended to be limited to the details shown, since various modifications and structural changes may be made without departing from the spirit of the present invention.

I claim:

1. A system for thickening a suspension of solids, to deliver filtrate liquid and thickened sludge, which comprises a continuous filtration-thickening apparatus having tank means closed at the top and containing groups of depending filter elements, filtrate receiving chambers each communicating with the top ends of a respective group of said filter elements, means for pressure feeding solids suspensions to said tank means, back wash conduit means for supplying filtrate wash liquid to the filter elements, distributing valve means cooperatively associated with said receiving chambers and with said back wash supply conduit means, and operable for supplying a reverse flow of said filtrate liquid at different times to different receiver chambers and their respective groups of filter elements, while subjecting to pressure filtration the filter elements not being washed, filtrate discharge conduit means leading from said valve means, and sludge discharge conduit means leading from said tank means, a first pump means, branch conduit means leading from said filtrate discharge conduit means to said first pump means, means connecting said back wash conduit means to the delivery end of said first pump means for delivering back wash liquid at a pressure greater than the fed pressure of the feed suspension, a first control device located in said filtrate discharge conduit means downstream from said branch conduit, for automatically maintaining a substantially constant pressure at the intake side of said first pump means, and a second control device located in said back wash conduit means, effective to admit filtrate liquid for back washing at a substantially constant rate of flow at a pressure greater than said feed pressure of the feed suspension.

2. The system according to claim 1, with the addition of second pump means connected to the tank for withdrawing sludge from the tank means, and a third control device for maintaining the sludge level in said tank means within predetermined limits, which comprises a throttle valve at the delivery side of said second pump means for controlling the rate of pump discharge, a controller responsive to changes in the sludge level, and having relay means for compensatingly actuating said throttle valve.

3. The system according to claim 2, wherein said controller is of the type that is responsive to differential pressure changes derived from density changes in a liquid column of predetermined height.

4. A system for thickening a suspension of solids, to deliver filtrate, liquid and thickened sludges, which comprises a continuous filtration-thickening apparatus having tank means closed at the top and containing groups of depending filter elements, filtrate receiving chambers each communicating with the top ends of a respective group of said filter elements, means for feeding solids suspension to said tank means, back wash conduit means for supplying filtrate liquid to the filter elements, valve means cooperatively associated with said receiving chambers and with said back wash supply conduit means, and operable for supplying a reverse flow of said filtrate liquid at different times to different receiver chambers and their respective groups of filter elements, while subjecting to pressure filtration the filter elements not being washed, filtrate discharge conduit means leading from said valve means, and sludge discharge conduit means leading from said tank means, a first pump means, a first branch conduit means leading from filtrate discharge conduit means to said first pump means, means connecting said back wash conduit means to the delivery end of said first pump means for delivering back wash liquid at a pressure greater than the feed pressure of the feed suspension, a first control device located in said filtrate discharge conduit means downstream from said branch conduit, for automatically maintaining a substantially constant pressure at the intake side of said first pump means, a second control device located in said back wash conduit means, effective to admit filtrate liquid for back washing at a substantially constant rate of flow at a pressure greater than said feed pressure of the feed suspension, second pump means connected to the tank for withdrawing sludge from the tank means, a third control device for maintaining the sludge level in said tank means within predetermined limits, which comprises a throttle valve at the delivery side of said second pump means for controlling the rate of pump discharge, a controller responsive to changes in the sludge level, and having relay means for compensatingly actuating said throttle valve, a first normally open intake valve at the intake side of said first pump means, a wash tank for containing special back wash solution to be applied periodically to the filter elements, an intake connection leading from said wash tank to the intake of the first pump means, and having a second normally closed intake valve, a third normally open discharge valve between the delivery side of said second pump means and said throttle valve, a second branch conduit means leading from the delivery side of the second pump means upstream from said third valve, a fourth normally closed discharge valve in said branch conduit, and means for draining said tank means during stoppage of the operation of said apparatus, said first pump means being operable to supply said special wash liquid sequentially to said group of filter elements when said first valve is closed and said second valve is open, said second pump means being operable to deliver partially spent or spent special wash liquid when said third valve is closed and said fourth valve is open.

5. A continuous pressure filter apparatus for thickening a suspension of solids, to deliver filtrate liquid and thickened sludge, horizontal plate means having elongated hollow filter elements depending therefrom and connected therewith so as to allow filtrate liquid from the interior of said filter elements to pass upwardly through said plate means, tank means surrounding said depending filter elements and connected to said plate means whereby said plate means closes one end of said tank means, and having feed means for supplying said suspension to said tank means under pressure forcing filtrate into the interior of said filter elements and upwardly through said plate means while causing the solids to accumulate on said filter elements, and also having discharge means for delivering settled sludge from said tank means, hollow cover means constituting with said plate means a substantial number of filtrate receiver chambers associated each with a group of said depending filter elements, backwash pressure liquid supply means for backwashing said filter elements under pressure greater than the feed pressure, a valve device operable for establishing flow communication from said backwash supply means sequentially and in repetitive cycles to said filtrate receiver chambers for sequentially backwashing said groups of filter elements, said valve device comprising a peripheral upright wall, a top plate, and a bottom plate constituting with said wall and top plate a valve housing, said bottom plate having flow passage openings equally spaced around the vertical axis of said housing, and communicating with respective filtrate receiver chambers, a rotary valve member in said housing, providing a conduit turnable about said axis and cooperating with said flow passage openings to supply backwash liquid sequentially to said group of filter elemnts, a stationary structure defining in said housing a supply chamber for backwash liquid communicating with said wash liquid supply means, as well as with the inlet end of said conduit during its rotation, and having substantially liquid-sealed relationship with said conduit, and a filtrate collecting chamber receiving filtrate liquid from said receiver chambers and the respective groups of filter elements, and means for discharging filtrate liquid from said collecting chamber of the housing.

6. The apparatus according to claim 5, wherein said valve device is associated with a single tank having a horizontal plate member from which said filter elements depend, and having a single domed cover member having internal radial partitions closing upon said plate member, and defining sector-shaped filtrate receiver chambers communicating with respective groups of filter elements, as well as with respective flow passages in the bottom plate of said valve housing.

7. The method of continuously thickening a suspension of solids by filtration under pressure, to deliver filtrate liquid and a thickened sludge with periodic backwashing of the filter media, which comprises establishing a sequence of pressure filtration zones wherein elongated hollow filter elements have their upper ends mounted in a plate so that filtrate liquid forced by the pressure into the interior of said filter elements will pass upwardly through the plate from each filtration zone into a separate receiving zone, continuously pressure feeding said suspension into said filtration zones, providing a supply of backwash liquid at a pressure greater than the feed pressure in said filtration zones, sequentially and in repetitive cycles establishing flow connection from said backwash supply to each of said filtrate receiving zones for backwashing the filter elements thereof, while continuing filtration of the filter elements in zones not communicating with the wash supply, whereby a layer of solids from said suspension accumulates on said filter elements under said filtration pressure, and is released by said greater backwash pressure to gravitate through surrounding liquid into a subjacent zone of sludge accumulation, passing filtrate liquid from filtrate receiving zones not communicating with said backwash supply, diverting a portion of the filtrate liquid to a storage zone, pumping liquid from said storage zone to provide the backwash pressure, and maintaining the return flow of backwash filtrate liquid into said filter elements substantially independent of backwash flow resistance by the filter elements.

8. The method of continuously thickening a suspension of solids by filtration under pressure, to deliver filtrate liquid and a thickened sludge with periodic backwashing of the filter media, which comprises establishing a sequence of pressure filtration zones wherein elongated hollow filter elements have their upper end mounted in a plate so that filtrate liquid forced by the pressure into the interior of said filter elements will pass upwardly through the plate from each filtration zone into a separate receiving zone, continuously pressure feeding said suspension into said filtration zones, providing a supply of backwash liquid at a pressure greater than the feed pressure in said filtration zones, sequentially and in repetitive cycles establishing flow connection from said backwash supply to each of said filtrate receiving zones for backwashing the filter elements thereof, while continuing filtration of the filter elements in zones not communicating with the wash supply, whereby a layer of solids from said suspension accumulates on said filter elements under said filtration pressure, and is released by said greater backwash pressure to gravitate through surrounding liquid into a subjacent zone of sludge accumulation, withdrawing sludge from said accumulation, passing filtrate liquid from filtrate receiving zones not communicating with said backwash supply, and automatically controlling the rate of flow of backwash liquid at a substantially constant predetermined volumetric amount.

9. In a filtration thickening apparatus, a group of elongated hollow filter elements depending from a plate member dividing a pressure filtration zone from a filtrate receiving zone, and subjected to alternate periods of filtration and backwashing, each filter element comprising a rigid liquid-permeable diffuser tube having an upper open end extending through said plate member and provided with a rigid horizontal flange located adjacent the top side of said plate member, and having a free lower end, a sleeve of flexible filter media surrounding said diffuser tube and having an upper end terminating adjacent said rigid tube flange, said sleeve being closed at the lower end, a flange member consisting of resiliently flexible material having a flat flange portion and a cylindrical portion sealingly connected to said upper end portion of said sleeve, said flat flange portion being interposed between said plate member and said flange of the rigid tube with said cylindrical portion extending downwardly from the top side of said plate, a retainer plate provided with an opening registering with the upper open end of said rigid tube of said filter elements, and means for securing said retainer plate relative to said plate member and tightly against the flanged end of the rigid tubes whereby said flange portion of resiliently flexible material provides a sealing gasket effective between said plate member and said rigid flange, and whereby said rigid flange cooperates with said gasket, with said plate member, and with said retainer plate to provide the sole and stabilized connection between said filter element and said plate member.

References Cited
UNITED STATES PATENTS

| | | | |
|---|---|---|---|
| 2,035,592 | 3/1936 | Christensen | 210—333 X |
| 2,391,534 | 12/1945 | Yerrick et al. | 55—294 X |
| 2,731,107 | 1/1956 | Hersey | 55—302 X |
| 2,826,308 | 3/1958 | Koupal | 210—356 X |
| 3,074,561 | 1/1963 | Mummert | 210—333 |
| 3,225,933 | 12/1965 | Berline | 210—346 X |
| 3,228,528 | 1/1966 | Mummert et al. | 210—413 X |
| 3,280,980 | 10/1966 | King | 210—333 X |
| 3,291,310 | 12/1966 | Marvel | 210—356 X |

FOREIGN PATENTS 1,271,222   1/1961   France.

REUBEN FRIEDMAN, *Primary Examiner.*

SAMIH N. ZAHARNA, *Examiner.*

D. M. RIESS, *Assistant Examiner.*